United States Patent
Kloss

[15] 3,693,948
[45] Sept. 26, 1972

[54] BUBBLE CAPS FOR BUBBLE COLUMNS

[72] Inventor: Hans-Joachim Kloss, Hilden, Germany

[73] Assignee: Julius Montz GmbH, Hilden, Germany

[22] Filed: April 2, 1970

[21] Appl. No.: 29,347

[30] Foreign Application Priority Data

April 5, 1969 Germany..........P 19 17 536.1

[52] U.S. Cl..........................261/114 A, 261/114 VT
[51] Int. Cl. ................................B01d 3/20
[58] Field of Search.......261/113, 114 R, 114 A, 114 VT, 261/114 JD

[56] References Cited

UNITED STATES PATENTS

| | | |
|---|---|---|
| 2,225,390 | 12/1940 | Ostergaard.............261/114 R |
| 3,055,646 | 9/1962 | Eld et al. .............261/114 VT |
| 3,287,004 | 11/1966 | Nutter.................261/114 VT |
| 3,445,095 | 5/1969 | Braun et al..........261/114 VT |

FOREIGN PATENTS OR APPLICATIONS 645,354   7/1962   Canada

Primary Examiner—Tim R. Miles
Assistant Examiner—Steven H. Markowitz
Attorney—Burgess, Dinklage & Sprung

[57] ABSTRACT

Bubble cap tray for bubble cap columns, comprising a plurality of bubble caps, each bubble cap having a top and a skirt extending downwardly from the top, openings for discharge of gas through the bubble cap at spaced intervals along the skirt, dividing the skirt into gas discharge openings and closed areas intermediate with the gas discharge openings, the openings of each cap confronting closed areas of the adjacent caps, so that gas streams issuing from the cap openings are not directed against one another.

12 Claims, 11 Drawing Figures

Inventor:
HANS-JOACHIM KLOSS

Inventor:
HANS-JOACHIM KLOSS

Inventor:
HANS-JOACHIM KLOSS

BUBBLE CAPS FOR BUBBLE COLUMNS

BACKGROUND OF THE INVENTION

The invention relates to a bubble tray for bubble-type exchange columns. With a bubble tray, a downwardly open pot, which is a so-called bubble cap, is disposed above an opening in the tray plate, the rim of said cap being spaced from the tray plate by an amount which is smaller than the height of the liquid on the said plate. As a consequence, the gases flowing upwardly through the opening first of all ascend into the interior of the cap and from thence downwardly around the rim of the cap, so that they are compelled to flow through the liquid over a predetermined distance. Whereas the caps in many bubble trays are of circular cross-section, the term bubble cap is used herein is also to be understood to cover trays with which the caps have different forms, for example, the form of elongated rectangles.

Hitherto, with such caps, the gases were led out over practically the entire periphery of the rim of the caps, while with elongated caps, they were led out over the entire length of the two longitudinal sides from the cap.

The invention has for its object to increase the efficiency of such trays. If an attempt is made to increase the efficiency of such trays by providing more caps, that is to say, having the caps more densely arranged, it is found that the gases between the caps project the liquid upwardly. The result is a throughflow of different strengths at different parts of the liquid. Consequently, the possibility of improving the efficiency by increasing the number of caps is greatly limited, especially with high gas flows.

According to the invention, this difficulty is avoided by the cap having passage openings for discharging gas only on parts of its periphery, and by the caps of the tray being so arranged that no opening of a cap is face-to-face with an opening of an adjacent cap. Thus if any openings of a cap are oriented directly towards an adjacent cap, the parts of the adjacent cap opposite such openings are imperforate.

The horizontal cross-section of the caps can assume different forms; by way of example, it may have the form of a circle or of a uniform, even-numbered polygon, the form of a rectangle with substantially equal side lengths or with very different side lengths. Using a cap of which the cross-sectional form is an elongated rectangle, it is either possible for alternately closed and open parts to be disposed adjacent one another on the longitudinal sides, or it is also possible for the entire longitudinal side to be open, while the transverse sides are closed. In such a case, it is expedient for such caps to be so arranged that several rows of such caps disposed in series in the longitudinal directions and with spacings equal to their length are situated at right angles to one another, that caps are alternately disposed at right angles to one another in each of these directions and the liquid streams leaving the longitudinal sides of the similarly directed caps of adjacent rows are offset from one another.

The caps can be fixed on the tray above a passage opening for the gas. However, they can also be let into corresponding openings of the tray and thus close off the openings, if they are not lofted by the pressure of the upwardly flowing gas. They then operate as valves. In such cases, it is desirable for the caps to be made of sheet metal with projections or stops, which limit the upward and downward movements of the cap in relation to the tray.

Several embodiments of the invention are shown by way of example in the drawings.

Figure 2:
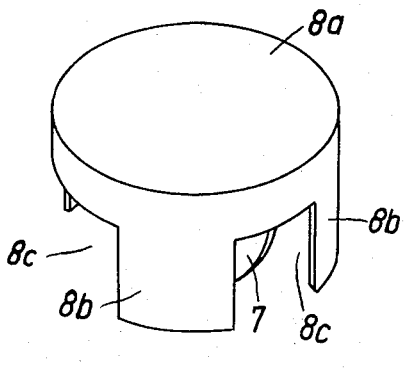
FIG. 2 is a perspective view of a cap which corresponds to the caps shown in FIG. 1.
Figure 1:
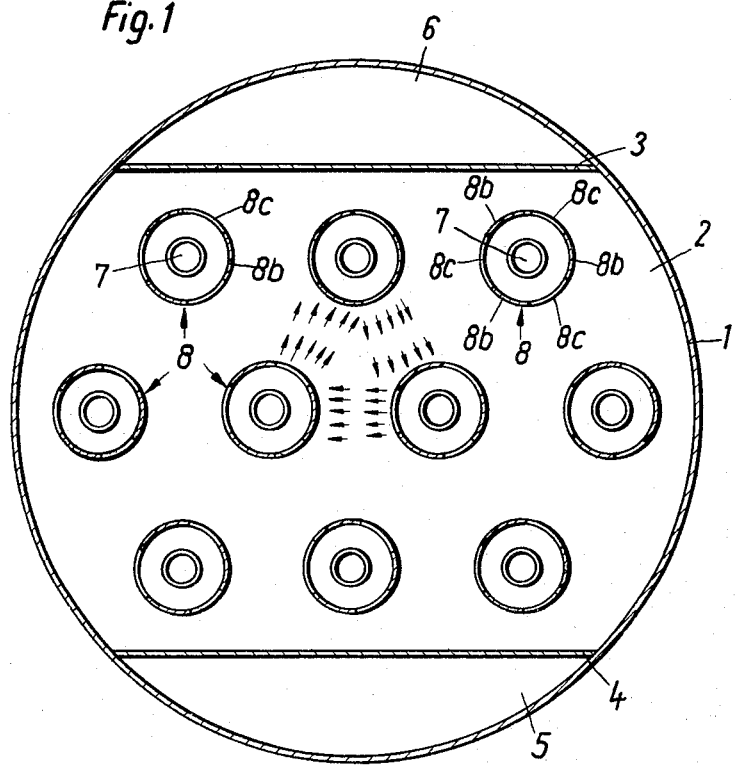
FIG. 1 is a plan view of a bubble tray with a large number of caps, which are shown in horizontal section.

The horizontal tray 2 which is shown in is fixed to the column wall 1 and limited by the two weirs 3 and 4 which are parallel to one another. The weir 4 separates a section 5 of the plate from the column tray said section lying in the same plane as the column tray 2. The space 6 between the weir 3 and the column tray 1 is empty. The liquid flowing over the weir 3 flows through the space 6 on to the tray section 5 of the subjacent tray, which is thus oriented in the other direction from FIG. 1, i.e. turned through 180°. The tray section 5 likewise receives the liquid to be treated from the tray section situated above it, the said liquid then being steadied over the weir 4 and flowing on to the tray 2. The height of the liquid which is on the tray 2 is thus established by the height of the weir 3. The tray 2 has a number of round openings 7, each of which is covered by a cap 8. As shown in FIG. 2, the cap 8 has the form of a cylindrical, downwardly open pot with a top 8a and lateral cut-outs 8c, which are distributed uniformly around the circumference, and each have a length equivalent to 60°. These caps 8 are so arranged on the base 2 that always an opening 8c is disposed opposite a closed part 8b of the adjacent cap in the radial direction. The axial height of the cut-outs 8c is somewhat smaller than the height of the weir 3, so that the liquid level is somewhat higher than the upper boundary of the cut-outs 8c.

Gases flow upwardly through the openings 7 of the tray 2 (the term gases is used here in the most general sense and covers more especially also vapors). Consequently, they penetrate through the liquid disposed inside the caps and force the liquid out of the openings 8c, as shown by the arrows in FIG. 1. The streams of gas thus discharging from the openings 8c encounter the closed surfaces 8b of the adjacent caps and are in any case not directed towards one another in such a way that the liquid could be agitated by them. Consequently, it is possible for the caps to be arranged in comparatively dense formation and thus to provide a comparatively large number of caps on one bubble tray.

Figure 3:
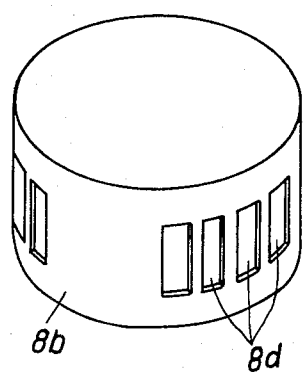
FIG. 3 is a perspective view of another form of cap for such a bubble tray.

The cap according to FIG. 3 differs from the cap according to FIG. 2 by the fact that several openings 8d are provided instead of the cut-out 8c, said openings not extending as far as the base; a group of these openings 8d is disposed in a region equivalent to about 60° of the circumference of the cap, so that closed wall surfaces 8b remain between two such groups of openings 8d.

Figure 4:
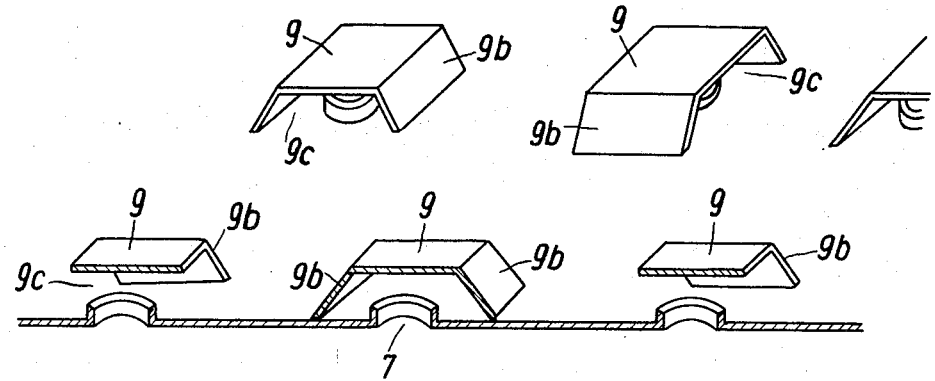
FIG. 4 is a view, partly in section and partly in perspective, of a bubble tray with caps having a cross-section which is in the form of a rectangle of substantially equal side lengths.

The caps according to FIG. 4 have a substantially square cross-section. The height thereof is smaller than the height of the liquid which is on the tray 2. Each of these caps consists of a sheet bent to trapezoidal form, the upper side thereof being horizontal, i.e. parallel to the tray 2. The plates 9 are fixed on the tray 2, and in fact in each case above a gas passage opening 7. These caps 9 thus have two openings 9c which are opposite one another and two sloping walls 9b which are likewise opposite one another. The caps are arranged in parallel rows, and always in such a way that the opening 9c of one cap faces the closed wall 9b of the adjacent cap.

Figures 5, 6:
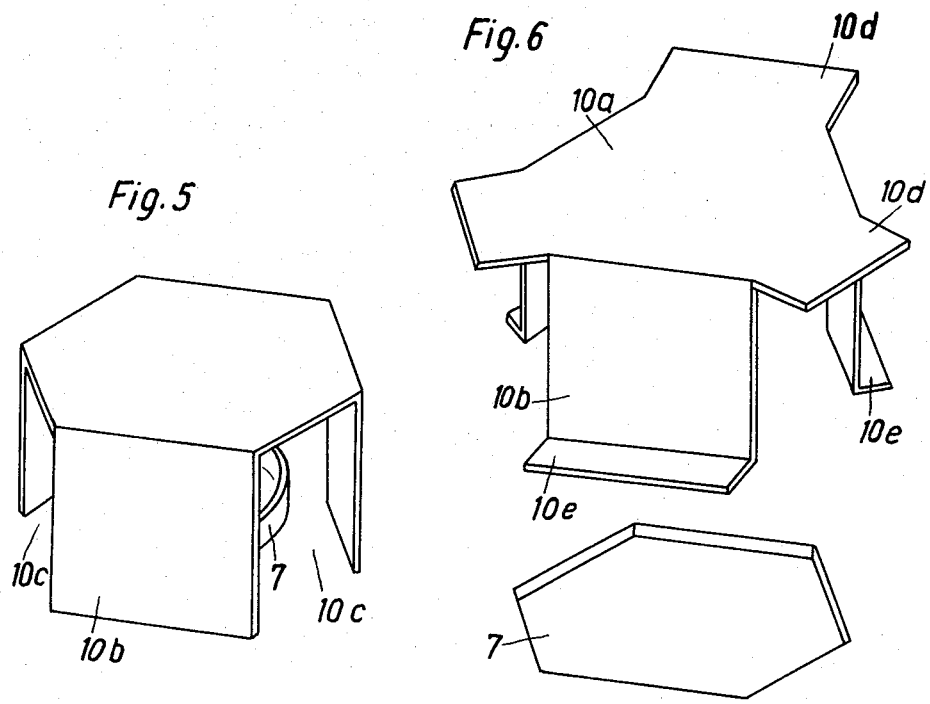
FIG. 5 is a perspective view of a cap of hexagonal cross-section.
FIG. 6 is a cap of a similar type to FIG. 5, but which is not fixed on the bubble tray, but is let into said tray.

FIG. 5 shows a cap 10 of hexagonal cross-section which is connected to the tray and in which alternate side surfaces 10b are closed and 10c are open.

FIG. 6 shows a cap which only differs from the cap according to FIG. 5 by the fact that its upper side 10a is extended by projections 10d, and that its side walls 10b are extended by horizontal projections 10e. This cap is so fitted into a corresponding hexagonal opening 7 in the tray that the projections 10e are disposed beneath the tray and the projections 10d above the tray. This cap is lifted by the pressure of the ascending gased, the projections 10d and 10e limiting the upward movement of the cap.

Figure 7:
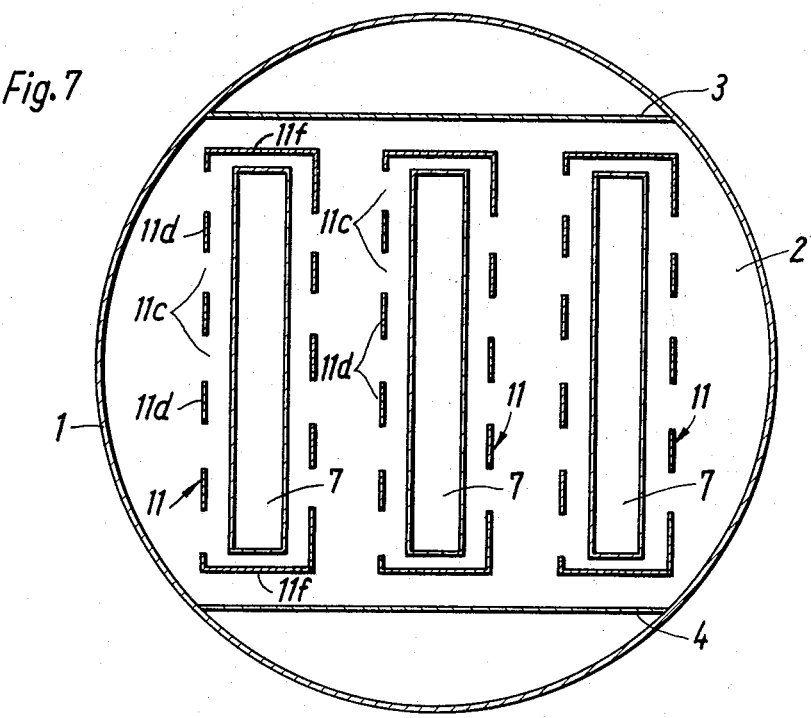
FIG. 7 is a plan view of a bubble tray having three caps of rectangular cross-section, the longitudinal sides of said caps being considerably longer than the transverse sides.

The tray 2 which is shown in plan view in FIG. 7 has three openings 7 which are parallel to one another and which are for the ascending gases. Each of these openings 7 is covered by a cap 11, which has in horizontal cross-section the form of a rectangle, having long sides the length of which is substantially greater than that of the transverse sides 11f. The long sides consist alternately of closed areas 11d and open areas 11c (see also FIG. 8). With each of the trays 11, an opening 11c is disposed opposite a closed area 11d. The three caps 11 are so arranged that the opening 11c of one cap is opposite a closed area 11d of the other cap. The opening 7 in the tray 2 has been formed by corresponding flanges having been stamped out of the tray 2 and then bent upwardly at a right angle.

Figure 9:
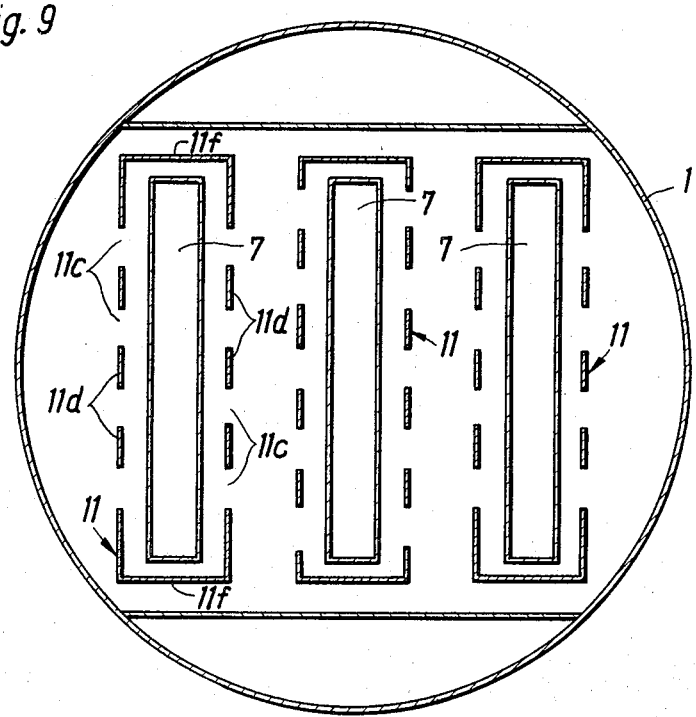
FIG. 9 is a plan view of a bubble tray somewhat similar to FIG. 7.
Figure 8:
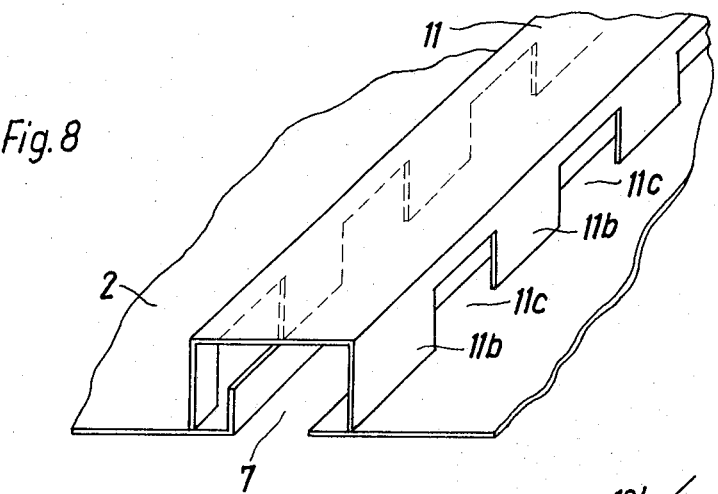
FIG. 8 shows a part of the bubble tray in FIG. 7, partly in section and partly in perspective.

The tray according to FIG. 9 only differs from the tray according to FIGS. 7 and 8 by the fact that, as regards the individual caps 11, the lateral openings 11c face one another.

Figure 10:
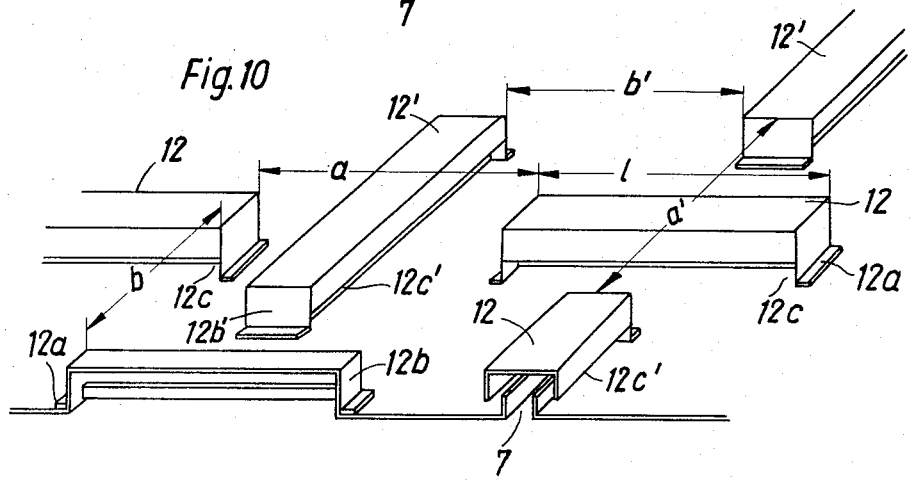
FIG. 10 is a view, partly in section and partly in perspective, showing another form of bubble tray according to the invention and having caps fixed on the tray.

According to FIG. 10, caps 12 of rectangular cross-section are so arranged in rows parallel to one another that the caps 12 lying one after the other in one row are disposed at a distance $a$ from one another which is just as large as their length 1. The spacing $b$ between the center lines of two rows of caps 12 is also equal to the length $l$. Arranged at regular intervals at right angles to the rows of caps 12 are like rows of identical caps 12', the arrangement being such that their spacings $a'$ and $b'$ are equal to the spacings $a$ and $b$. The caps 12 and 12' are closed at their end faces 12b and 12b' and are provided on their longitudinal sides and throughout their length with an opening 12c or 12c'. In this way, large outlet openings 12c and 12c' are provided, without the streams discharging therefrom being directed opposite one another.

Figure 11:
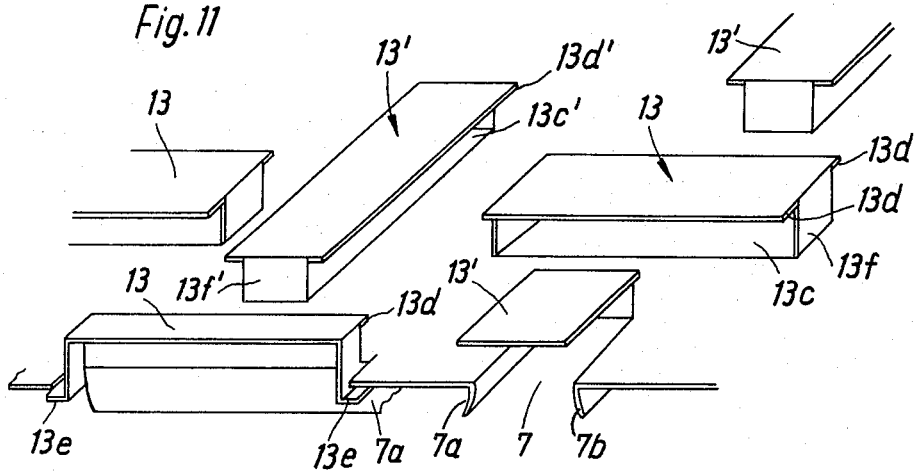
FIG. 11 is also a view, partly in section and partly in perspective, of a bubble tray similar to FIG. 10, but in which the caps are let into corresponding openings of the tray.

The tray according to FIG. 11 differs from the tray according to FIG. 10 by the fact that the caps 13 and 13' are let into the openings 7 of the tray 2 and are provided with projections 13d and 13e, which limit their upward and downward movement in relation to the tray 2. In addition, the flanges 7a and 7b, which are stamped out from the tray 2 to form the slot 7, are bent over downwardly in such a way that they converge upwardly.

What is claimed as new and desired to be protected by Letters Patent is set forth in the appended claims.

I claim:

1. Bubble tray for bubble cap columns, comprising a weir and a downcomer at opposite sides of the tray, a plurality of openings in said tray between said weir and said downcomer, a plurality of closely spaced caps, each cap covering one of said openings and having a top and a skirt extending downwardly from the top, openings for discharge of gas through the bubble cap at spaced intervals along the skirt, dividing the skirt into gas discharge openings and closed areas intermediate with the gas discharge openings, the openings of each cap confronting closed areas of the adjacent caps, so that gas streams issuing from the cap openings are not directed against one another.

2. Bubble tray according to claim 1 having caps which in horizontal cross-section are in the form of a circle or in the form of a hexagon with alternately three sections having an opening or openings for the passage of gas and three imperforate sections.

3. Bubble cap tray according to claim 1, wherein the horizontal cross-section of the caps is rectangular and not of substantially different side lengths, skirt openings extending downwardly from two opposite sides and skirt closed areas extending downwardly from the other two sides.

4. Bubble tray according to claim 1, characterized in that the horizontal cross-section of the caps has the form of a rectangle, the length of which is considerably greater than the width and of which the longitudinal sides are open to a substantially uniform extent throughout their length, while the transverse sides are closed, and in which a number of such caps are so arranged at right angles to one another that several rows of such caps disposed one after the other in the longitudinal direction and at intervals equal to their length are so disposed at right angles to one another that caps alternating in each of these directions lie at right angles to one another and the streams of liquid discharging from the longitudinal sides of the caps in the same direction in adjacent rows are offset from one another.

5. Bubble tray according to claim 4, characterized in that the longitudinal openings of the tray beneath the caps are formed by stamping out two identical longitudinal flanges, which are so bent over downwardly that they converge upwardly.

6. Bubble tray for a bubble-type exchange column according to claim 1, said bubble tray having a number of openings for the passage of gas, a number of bubble caps over the openings, each cap having a periphery with openings therein leaving imperforate sections of the periphery, the caps being so arranged that each cap has at least one opening facing an imperforate section of an adjacent cap but no openings facing an opening of an adjacent cap.

7. Bubble tray according to claim 6, having caps which in horizontal cross-section have the form of a circle or a uniform even-numbered polygon and alternately have open sections for the passage of gas and imperforate sections, the said sections being of approximately the same size.

8. Bubble tray according to claim 6, having caps which in horizontal cross-section have the form of an elongated rectangle, and, on the long sides thereof, open and closed sections of substantially equal length alternating with one another.

9. Bubble tray according to claim 6, having caps which in horizontal cross-section have the form of a rectangle with not substantially different side lengths, two opposite sides of the rectangle being open and the other two sides being closed.

10. Bubble tray according to claim 9, characterized in that the closed portion of the periphery of one cap which is facing an open peripheral portion of an adjacent cap rises obliquely upwards.

11. Bubble tray according to claim 6, characterized in that the caps are let into corresponding openings of the tray and thus close off the openings if they are not lifted by the pressure of an upwardly flowing gas.

12. Bubble tray according to claim 11, characterized in that the caps have projections or stops on their upper and lower rims, which limit their upward and downward movement relatively to the tray.

* * * * *